US005537781A

United States Patent [19]
Bisnack et al.

[11] Patent Number: 5,537,781
[45] Date of Patent: Jul. 23, 1996

[54] HARD-TOP VEHICLE WINDOW REGULATOR SYSTEM

[75] Inventors: William C. Bisnack, Davisburg; Jesse J.-S. Jou, Clarkston; Timothy A. Wirsing, Saginaw; Alex N. Draper, Clio, all of Mich.

[73] Assignee: General Motors Corporation, Detroit, Mich.

[21] Appl. No.: 412,813

[22] Filed: Mar. 29, 1995

[51] Int. Cl.⁶ ................................................. E05F 11/44
[52] U.S. Cl. ............................... 49/351; 49/227; 49/349
[58] Field of Search ............................. 49/351, 349, 350, 49/502, 227

[56] References Cited

U.S. PATENT DOCUMENTS

| | | | |
|---|---|---|---|
| 4,428,157 | 1/1984 | Engelsberger et al. | 49/502 |
| 4,662,115 | 5/1987 | Ohya et al. | 49/502 |
| 4,669,221 | 6/1987 | Ugawa et al. | 49/352 |
| 4,702,040 | 10/1987 | Hellriegel | 49/502 |
| 4,769,951 | 9/1988 | Kaaden | 49/502 |
| 4,882,842 | 11/1989 | Basson et al. | 29/857 |
| 4,905,412 | 3/1990 | Srock et al. | 49/352 |
| 4,937,977 | 7/1990 | Gergoe et al. | 49/352 |
| 4,964,238 | 10/1990 | Nishijima et al. | 49/352 |
| 4,974,365 | 12/1990 | Ono | 49/502 |
| 5,070,648 | 12/1991 | Moriyama | 49/352 |
| 5,095,659 | 3/1992 | Benoit et al. | 49/502 |
| 5,255,470 | 10/1993 | Dupuy | 49/351 X |
| 5,366,268 | 11/1994 | Miller et al. | 297/216.1 |

FOREIGN PATENT DOCUMENTS 2325221 11/1973 Germany.

OTHER PUBLICATIONS 08,203,064 Wirsing Feb. 28, 1994.

*Primary Examiner*—Philip C. Kannan
*Attorney, Agent, or Firm*—Ernest E. Helms

[57] ABSTRACT

A modular window regulator system is provided for controlling the movement of a window which includes first and second cross arms pivotally joined to one another, each cross arm having first and second ends, the first cross arm first end being geared; a back plate mounting a driver gear for torsional engagement with the geared end of the first cross arm, the back plate mounting the first end of the second cross arm for linear movement; first and second channels extending generally vertically and transverse to the back plate and fixably joined thereto at opposite ends of the back plate; a sash slidably mounting the second end of the cross arms, the sash having first and second ends extending toward the first and second channels, respectively; a first guide block fixably connected to the sash first end and to the window, the first guide block having a vertical bearing connection with the first channel; a second guide block fixably connected to the sash second end and to the window, the second guide block having a vertical bearing connection with the second channel; and a fore/aft bearing on one of the guide blocks engaged with one of the channels, the fore/aft bearing being at a different elevation than the second ends of the cross arm, the second ends of the cross arm within the sash and the fore/aft bearing providing three point stability for moment force on the window in a plane of the window.

3 Claims, 4 Drawing Sheets

HARD-TOP VEHICLE WINDOW REGULATOR SYSTEM

FIELD OF THE INVENTION

The field of the present invention is that of an automotive vehicle door window regulator system for extendable windows in hard-top or convertible vehicles.

BACKGROUND OF THE INVENTION

There are two major types of vehicle door window arrangements. The first arrangement is that of a sedan-type vehicle door. In the sedan-type vehicle door, the door has a channel that extends above the belt level of the door and encloses a glass window pane when the glass window pane is in its top position. A second type of vehicle door is the hard-top vehicle door wherein the glass, after extending from the belt line of the vehicle door, is totally unsupported above the belt line and mates with the weatherstrip along a door opening of the vehicle. In the hard-top design, the stability of the window glass is totally achieved by its connection with the door below the belt line of the vehicle door. The hard-top vehicle door is also used in convertibles and other vehicle body styles.

Many vehicle doors with extendable windows of the hard-top variety have two parallel channels mounted within the interior of the door. A cross arm (as in Lam et al, U.S. Pat. No. 4,924,627), a cable (as in Dupuy, U.S. Pat. No. 5,067,281) or a tape drive (as in Staran et al, U.S. Pat. No. 4,642,941) regulator mechanism is thereafter attached with the vehicle door. Thereafter, the glass window is attached to the channel members via guide blocks to complete the assembly. The various components are then adjusted to ensure the proper fit of the window and to prevent any possible binding in the up and down movement of the window.

To reduce costs, and in an attempt to prevent alignment problems, it is desirable to allow the channel members and regulator mechanism to be assembled into the vehicle door as one pre-assembled unit with the guide blocks already on the channel members.

SUMMARY OF THE INVENTION

The present invention provides a modular window regulator system which allows easier assembly into the vehicle door while at the same time allowing virtually complete testing of the regulator system for possible binds before installation into the vehicle door.

BRIEF OF THE DRAWINGS

DESCRIPTION OF THE PREFERRED EMBODIMENT

Figure 1:
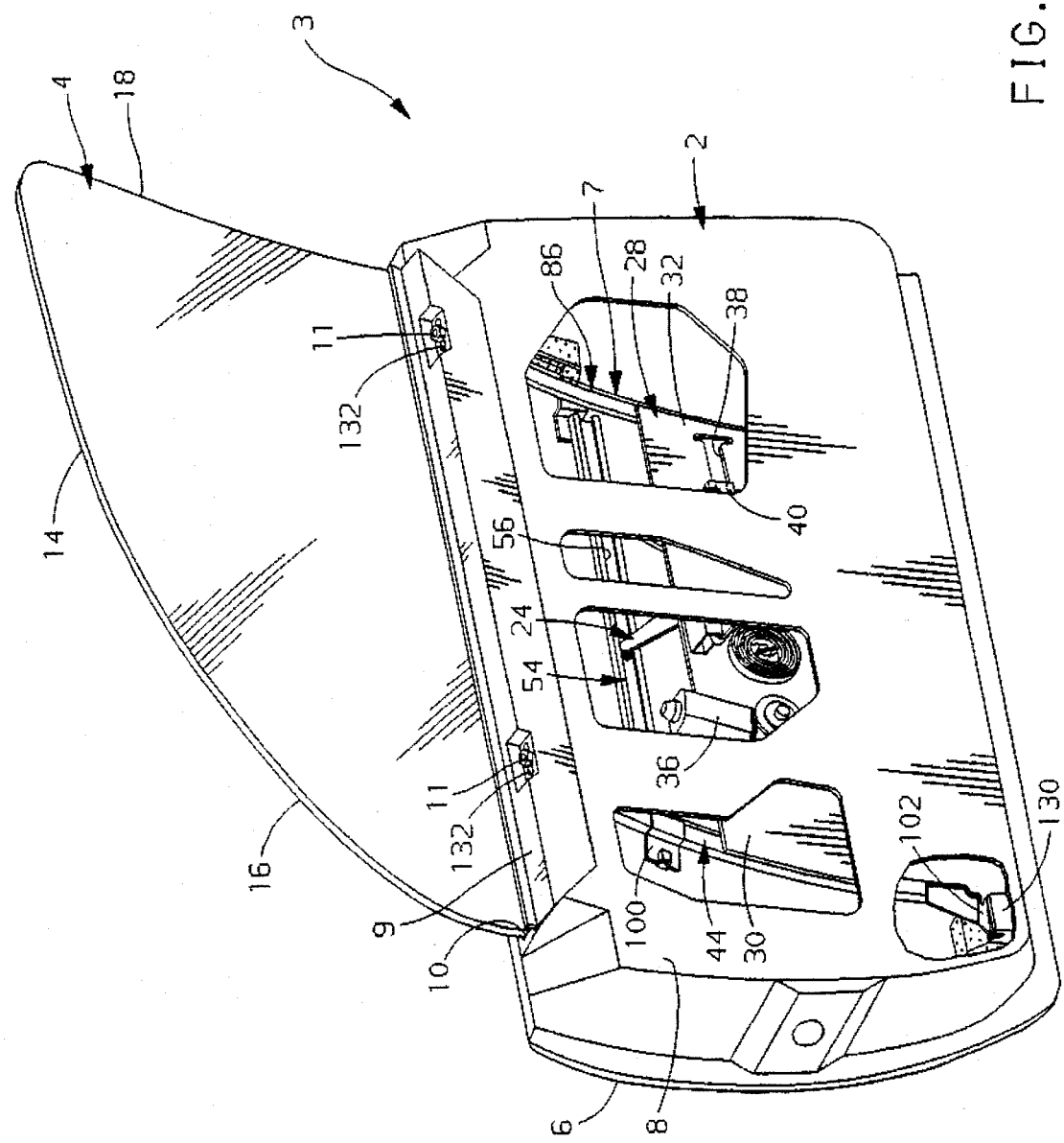
FIG. 1 is a perspective view of a preferred embodiment according to the present invention installed into a vehicle door.
Figure 2:
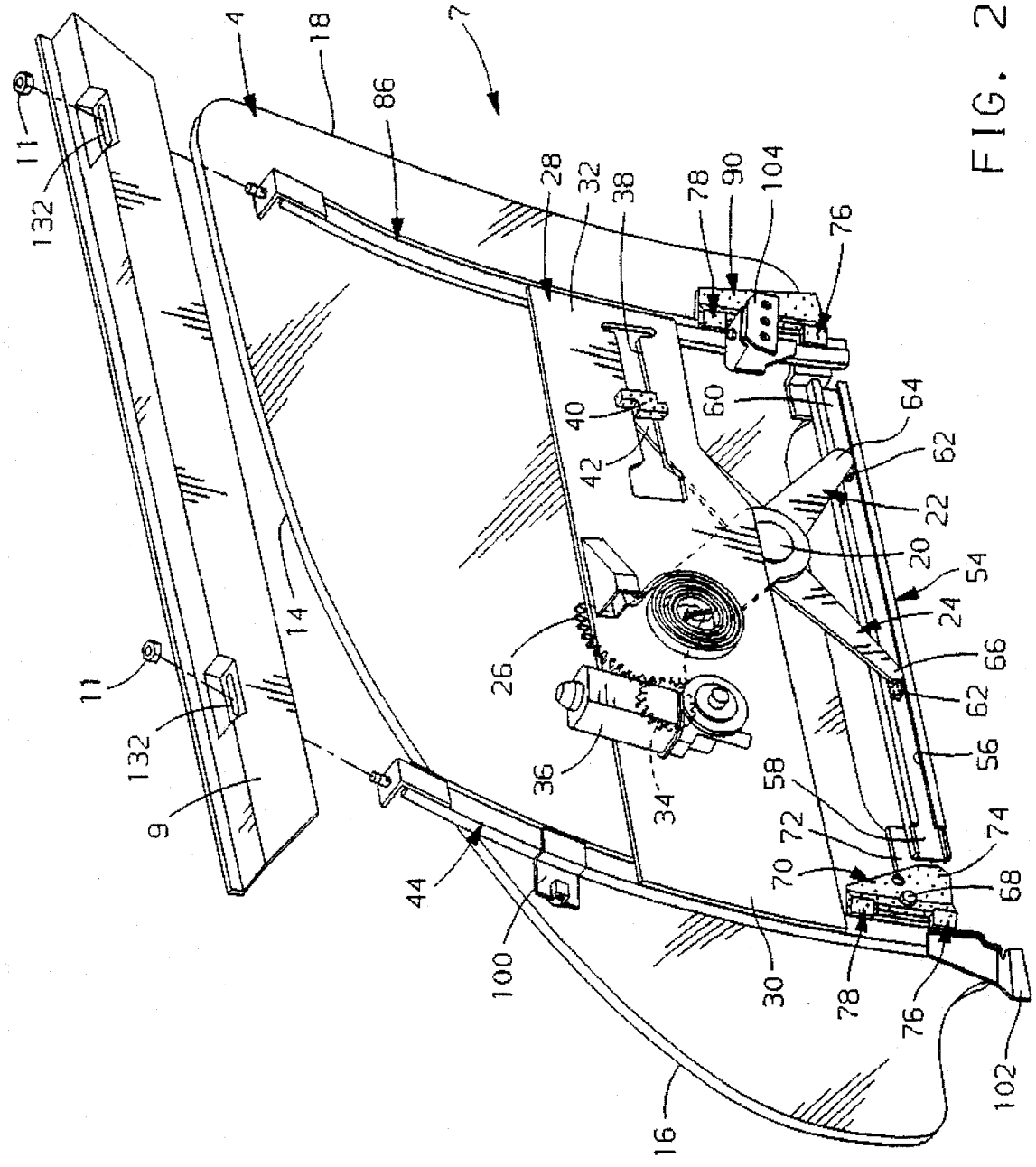
FIG. 2 is a view similar to that of FIG. 1 with the door envelope removed, revealing the inboard side of the window regulator system of the present invention.

Referring to FIGS. 1 through 7, a preferred embodiment hard-top vehicle door 3 utilizing the window regulator system 7 of the present invention is installed in a door body envelope 2 with an extendable and retractable glass, plastic or other rigid material window pane 4. The door body 2 has an outer panel 6 and an inner panel 8 spaced away from the outer panel 6. The inner panel 8 is capped by a top plate 9 which is joined by fasteners 11. The inner panel 8 and outer panel 6 form a spaced envelope having a top opening 10 (FIG. 1). The top opening 10 is covered by flexible elastomeric seals (not shown). The window 4 extends in and out of the door body 2 via the top opening 10 between the aforementioned seals.

The top edge 14 and side edges 16 and 18 of the glass window pane 4, as mentioned previously, are unsupported by the door 3 and rest against appropriate weatherstripping placed in the door opening (not shown) of a vehicle. Thus, the window regulator system 7 is that of a hard-top vehicle regulator used in hard tops or convertibles. Therefore, stability of the window 4 in the fore and aft direction of the vehicle, the vertical up and down direction of the vehicle and in a rotational sense of the glass window pane 4 (movement in the plane of the window pane 4) must be achieved by window regulator system 7.

Pivotally joined to each other at point 20 are the first 22 and second 24 cross arm assemblies. The first cross arm assembly 22 has a first end 26 with gear teeth.

A backing plate 28 extends generally in a fore and aft direction with a first end 30 and a second end 32. The backing plate 28 mounts a driver gear 34 (shown in hidden line, FIG. 2, typically toward the outboard side of the backing plate) which is torsionally engaged with the geared tooth end 26 of the first cross arm 22. The drive gear 34 is driven by an electric motor 36 in response to an operator command to translate the window pane 4 in (down) and out (up) of the vehicle door body 2. The backing plate also supports the electric motor 36. Additionally, the backing plate 28 has a linear slot 38 which mounts a polymeric slider 40 which is pivotally connected to the first end 42 of the second cross arm 24.

Figure 3:
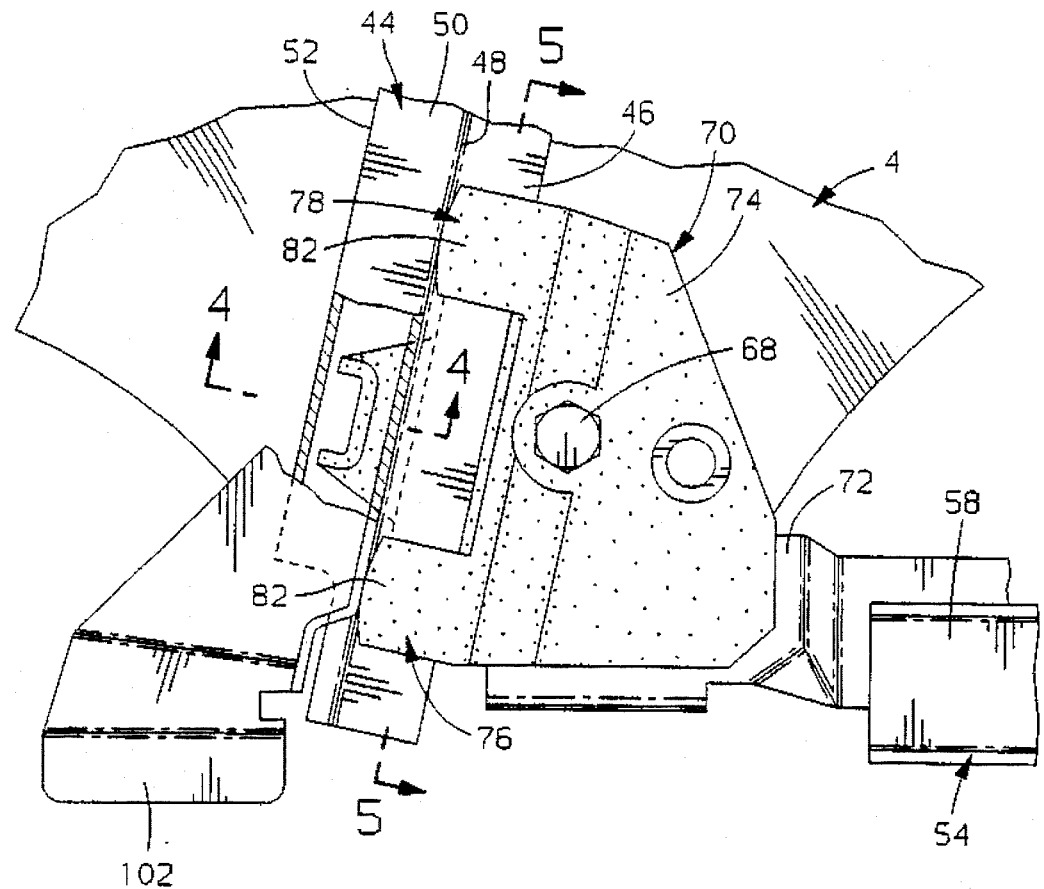
FIG. 3 is an enlarged view of a guide attached to the window glass and sash of the present invention slidably mounted on a fore channel.
Figure 4:
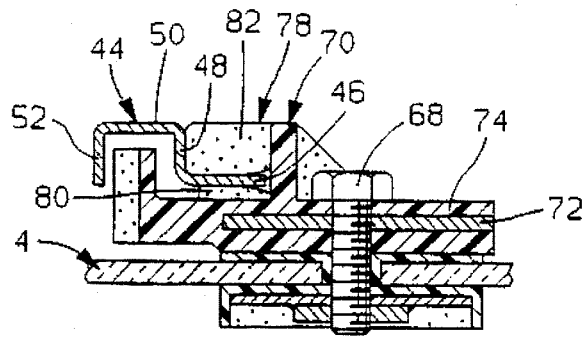
FIG. 4 is a view taken along line 4—4 of FIG. 3.
Figure 5:
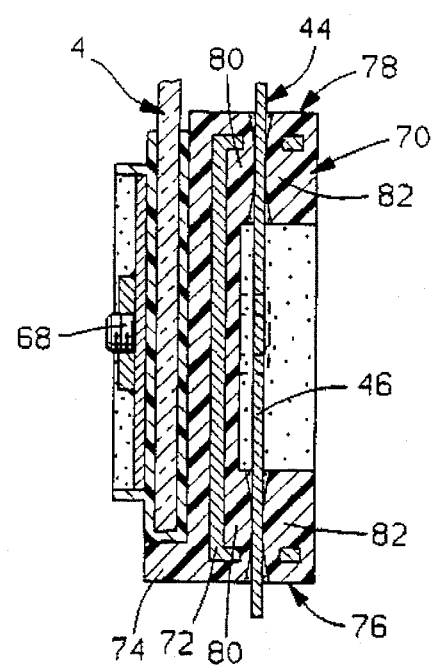
FIG. 5 is a view taken along line 5—5 of FIG. 3.

Fixably connected to the first end 30 of the backing plate is a first channel 44. The first channel 44 extends generally transverse to the backing plate and is oriented generally vertically although slightly inclined. Additionally, the first channel 44 is slightly concave, sloping in an inboard direction as it vertically extends upward, nearly matching the curvature of the window glass 4. Referring additionally to FIGS. 3, 4 and 5, the first channel 44 has a fore and aft flat or blade 46 joined to sides 48 and 50 and a final transverse member or blade 52.

The window regulator system 7 also has a sash 54 which is formed by a channel 56 which is typically weldably connected at a first fore end 58 and a second aft end 60. In an alternative embodiment (not shown), the connection can be by bolts or other fasteners. The sash channel 56 via sliders 62 slidably mounts second ends 64, 66 of the first and second cross arms 22, 24, respectively.

Referring to FIGS. 3, 4 and 5, fixably joined to the window glass 4 and to the first end 58 of the sash 54 by a fastener 68 is a first guide block 70. The guide block 70 is primarily fabricated from a metallic member 72 which is generally integral with the end 58 of the sash 54. The metallic member 72 is encapsulated with a polymeric material 74 which can be nylon, a glass fiber filled nylon or other suitable material such as acetal. The guide block 70 has a lower bearing 76 and an upper bearing 78. Bearings 76 and 78 have inner lobes 80 and outer lobes 82 which impinge on blade 46 of the channel to provide a vertical bearing which confines the travel of the glass in the inboard and outboard directions.

Figure 6:
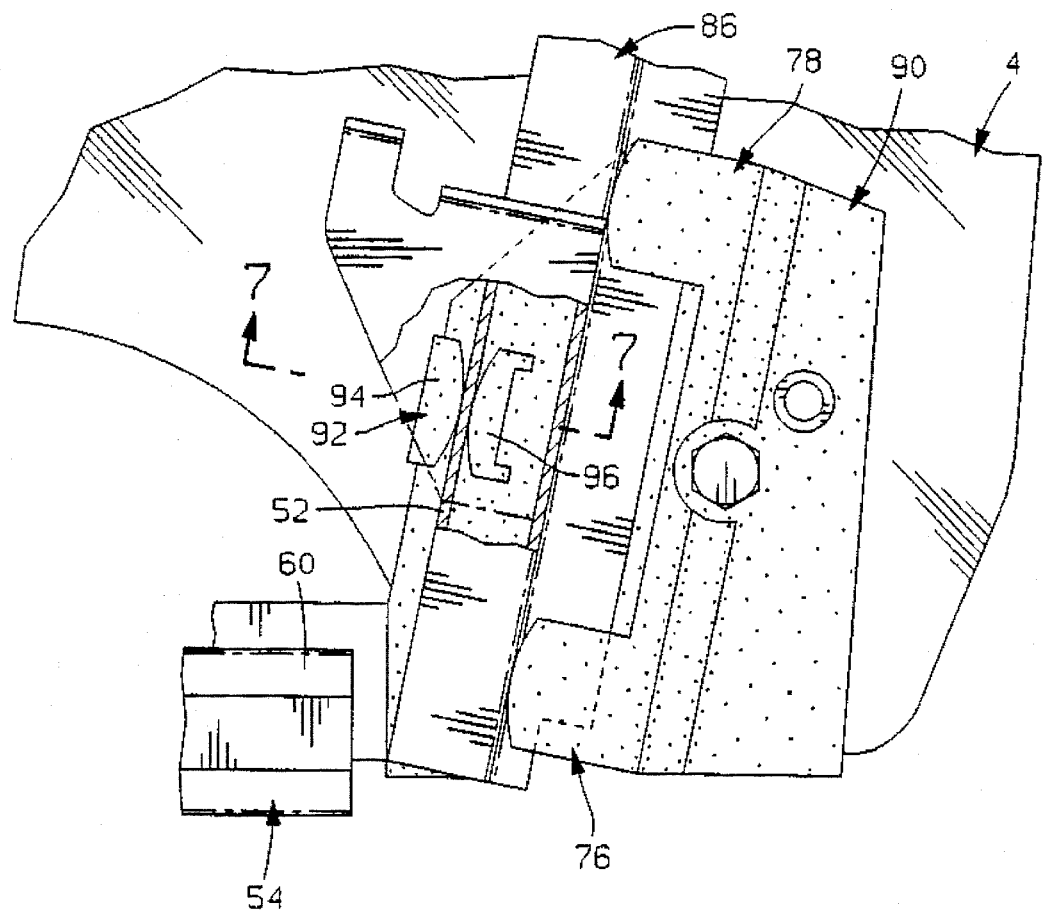
FIG. 6 is a view similar to that of FIG. 3 illustrating the guide slidably mounted on the aft channel.
Figure 7:
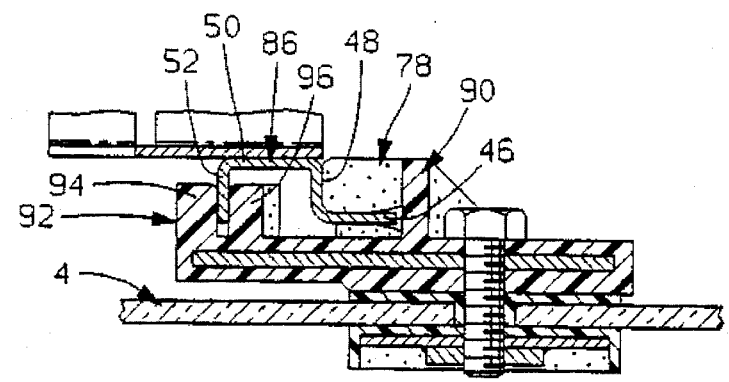
FIG. 7 is a view taken along line 7—7 of FIG. 6.

Referring to FIGS. 6 and 7, connected to the backing plate 28 in a similar fashion to that of the first channel 44 is a rear channel 86. The rear channel 86 has blade 46 and members 52, 50 and 48 in similar fashion to that of the first channel 44. Integrally joined to the second end 60 of the sash 54 and slidably mounted on blade 46 by lower and upper bearings 76 and 78 is a second guide block 90. In a like manner, guide block 90 is connected by welding or a mechanical method similar to fastener 68 to the second end 60 of the sash of glass pane 4. Referring in more detail to FIG. 7, the second guide block 90 has a fore and aft bearing 92 having fore lobe 94 and aft lobe 96 which provide a fore and aft bearing upon blade 52. The fore and aft bearing 92 sets the fore and aft position of the window glass 4 as the window glass is extended or retracted by the window regulator system 7.

The elevation of bearing 92 should be different than that of the second ends 66 and 64 of the cross arms so that a moment force in the plane of the glass 4 sets up a three-point force resistance between bearing 92 and ends 66 and 64 of the cross arms. Referring back to FIGS. 3 and 4, blade 52 of the first channel 44 has a clearance to ensure that there is only three-point and not four-point support of the window against moment forces, thereby reducing problems of binding which would be inherent with four-point resistance since in order for four-point resistance to work, the tolerance between the parallelism of the blades 52 would have to be far smaller to ensure the elimination of binding forces.

The first channel additionally has a glass stabilizer 100 to stabilize the glass for door slam (transverse glass motion) and at its bottom end has a blade 102. Blade 102 is utilized in the installation of the window regulator 7 to the door 3 in a manner described in Wirsing, U.S. Ser. No. 08/203,064 filed Feb. 28, 1994. The rear channel 86 also has fixably attached thereto a bracket 104 which attaches the aft end of the window regulator system 7 to the inner panel 8 if needed in an adjustable fashion. A top plate 9 becomes part of the door body and also fixably connects the top ends of the channels 44 and 86 to one another. An advantage of the present invention is that the window regulator system can be installed as a single unit with the window glass on or off. Additionally, the window regulator system 7 can be tested for any possible binding before installation into the vehicle door 3 rather than the prior system which required testing after installation since the separate pieces were assembled as separate members into the vehicle door inner panel.

Since the front side edge 16 of the window glass is at an angle, fore and aft adjustment of the regulator system 7 to match the vehicle door opening is critical. The present regulator system allows the whole regulator system 7 to be adjusted fore and aft due to movement of the blade 102 in the holding fixture 130 as described in aforementioned Wirsing Ser. No. 08/203,064 and due to slots 132 provided in the top plate 9. The fasteners which connect with bracket 104 are inserted into slots (not shown) of the inner panel 8 to allow for fore and aft adjustment.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A modular window regulator system for controlling the movement of a window glass extendable from a hardtop type vehicle door envelope with a top opening, the window generally extending in a first plane, the regulator system comprising:

first and second cross arms pivotally joined to one another, each cross arm having first and second ends, the first cross arm first end being geared;

a back plate mounting a driver gear the drive gear meshing with the geared end of the first cross arm, the back plate mounting the first end of the second cross arm for linear movement;

first and second channels extending generally vertically and transverse to the back plate and fixably joined thereto at opposite ends of the back plate;

a sash slidably mounting the second end of the cross arms, the sash having first and second ends extending toward the first and second channels, respectively;

a first guide block fixably connected to the first end of the sash and to the window glass, the first guide block having a vertical bearing connection with the first channel;

a second guide block fixably connected to the second end of the sash and to the window glass, the second guide block having a vertical bearing connection with the second channel: and a fore/aft bearing on one of the guide blocks engaged with one of the channels, the fore/aft bearing being at a different elevation than the second ends of the cross ann, the second ends of the cross arm within the sash and the fore/aft bearing providing three point stability for moment force on the window glass in the first plane of the window glass.

2. A window regulator as described in claim 1 wherein the channels are connected to a top cover which forms a partial closure of the top opening of the vehicle door.

3. A window regulator as described in claim 1 wherein the back plate further supports an electrically-driven motor to power the drive gear.

* * * * *